US007262944B2

(12) United States Patent
Komatsu et al.

(10) Patent No.: US 7,262,944 B2
(45) Date of Patent: Aug. 28, 2007

(54) RECEPTACLE

(75) Inventors: Fumikazu Komatsu, Okaya (JP); Mitsuaki Sawada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 190 days.

(21) Appl. No.: 11/049,735

(22) Filed: Feb. 4, 2005

(65) Prior Publication Data

US 2005/0186833 A1 Aug. 25, 2005

(30) Foreign Application Priority Data

Feb. 6, 2004 (JP) ............................ 2004-030859

(51) Int. Cl.
*H02H 3/20* (2006.01)

(52) U.S. Cl. .................................... 361/90; 365/230.06

(58) Field of Classification Search .................. 361/90
See application file for complete search history.

(56) References Cited

U.S. PATENT DOCUMENTS 4,878,145 A * 10/1989 Lace .......................... 361/118
5,515,334 A * 5/1996 Kotani et al. .......... 365/230.06
6,448,863 B1 * 9/2002 Ogawa et al. ................ 333/12
6,775,121 B1 * 8/2004 Chaudhry .................. 361/111

FOREIGN PATENT DOCUMENTS

JP A 6-261449 9/1994
JP A 2001-85118 3/2001

* cited by examiner

*Primary Examiner*—Stephen W. Jackson
*Assistant Examiner*—Luis E. Román
(74) *Attorney, Agent, or Firm*—Oliff & Berridge, PLC

(57) ABSTRACT

A receptacle which is defined in a given interface standard, performs data transfer by using differential signals, and is connected to a plug when transmitting a signal between devices. The receptacle includes: a power supply terminal; a ground terminal; a first differential signal terminal used for transmitting a first differential signal; a second differential signal terminal used for transmitting a second differential signal, the second differential signal terminal making a pair with the first differential signal terminal; and at least one protection element provided between the power supply terminal and the ground terminal.

10 Claims, 7 Drawing Sheets

RECEPTACLE

Japanese Patent Application No. 2004-30859, filed on Feb. 6, 2004, is hereby incorporated by reference in its entirety.

BACKGROUND OF THE INVENTION

The present invention relates to a receptacle.

As an interface standard for transmitting differential signals, the Universal Serial Bus (USB) standard, IEEE1394, and the like have been known. An interface conforming to such a standard is provided in various electronic instruments. In recent years, the size of an electronic instrument has been reduced accompanying an increase in demand for a portable instrument. In the electronic instrument equipped with the above-mentioned interface, a reduction of the size of the electronic instrument results in a decrease in the interconnect distance between a precision circuit such as an internal logic circuit and the interface (receptacle, for example). This may cause a problem to occur in the electronic instrument due to overvoltage and static electricity from the outside.

Japanese Patent Application Laid-open No. 6-261449 discloses a method for protecting an electronic instrument against overvoltage. However, since a receptacle provided in a small electronic instrument may have small dimensions, it is difficult to apply the method disclosed in Japanese Patent Application Laid-open No. 6-261449 to a receptacle provided in a small electronic instrument. Moreover, when applying the method disclosed in Japanese Patent Application Laid-open No. 6-261449 to a receptacle of which the dimensions are defined in the interface standard, the receptacle may not conform to the definition of the standard. Therefore, it is difficult to apply the method disclosed in Japanese Patent Application Laid-open No. 6-261449 to the above-mentioned interface.

Japanese Patent Application Laid-open No. 2001-85118 discloses a cable in which a common mode choke coil is provided to a connector. In the case where a protection element which protects an electronic instrument against overvoltage is provided to the connector inside the cable, the electronic instrument can be protected against overvoltage by connecting the cable with the receptacle. However, when the cable is removed from the electronic instrument, terminals inside the receptacle of the electronic instrument are not provided with protective measures. In this case, an internal circuit of the electronic instrument may be destroyed due to static electricity from the outside.

BRIEF SUMMARY OF THE INVENTION

According to one aspect of the present invention, there is provided a receptacle which is defined in a given interface standard, performs data transfer by using differential signals, and is connected to a plug when transmitting a signal between devices, the receptacle comprising:

a power supply terminal;

a ground terminal;

a first differential signal terminal used for transmitting a first differential signal;

a second differential signal terminal used for transmitting a second differential signal, the second differential signal terminal making a pair with the first differential signal terminal; and at least one protection element provided between the power supply terminal and the ground terminal.

DETAILED DESCRIPTION OF THE EMBODIMENTS

Figure 1:
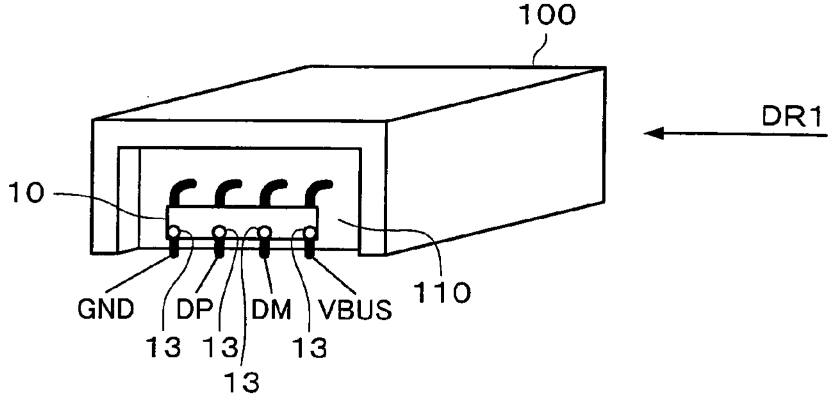
FIG. 1 is a schematic perspective view showing a receptacle according to a first embodiment.

The present invention has been achieved in view of the above-described technical problems. Embodiments of the present invention may provide a receptacle having dimensions defined in a given interface standard and also having a function of protecting an electronic instrument against damage caused by external static electricity, transient voltage, and the like.

According to one embodiment of the present invention, there is provided a receptacle which is defined in a given interface standard, performs data transfer by using differential signals, and is connected to a plug when transmitting a signal between devices, the receptacle comprising:

a power supply terminal;

a ground terminal;

a first differential signal terminal used for transmitting one of the differential signals;

a second differential signal terminal used for transmitting another of the differential signals, the second differential signal terminal making a pair with the first differential signal terminal; and at least one protection element provided between the power supply terminal and the ground terminal.

This enables an electronic instrument having the receptacle defined in the predetermined interface standard to be protected against damages caused by transient voltage and static electricity entering the power supply terminal or the ground terminal of the receptacle from the outside.

In this receptacle, dimensions of the receptacle may be defined in a given interface standard; the receptacle may further include a first section which is connected to the plug and a second section which is provided within a part other than the first section; and the protection element may be provided in the second section.

This enables the protection element to be arbitrarily provided while conforming to the predetermined interface standard. Moreover, an electronic instrument can be protected against damages caused by electromotive force which occurs due to a reactance component included in a plug, a cable, or the like and a reactance component included in the receptacle during plugging and unplugging, for example.

In this receptacle, the second section may have a terminal recess; the power supply terminal, the ground terminal, the first terminal, and the second terminal may stick out through a bottom of the terminal recess; and the protection element may be provided in the terminal recess.

This makes it unnecessary to provide an exclusive space for the protection element in an electronic instrument.

In this receptacle, the protection element may be at least one of an overvoltage protection element for overvoltage protection and a surge protection element for electrostatic protection.

The receptacle may comprise both the overvoltage protection element and the surge protection element as the protection element, wherein the surge protection element may be connected to the overvoltage protection element in parallel.

This enables the receptacle provided with the protection element to protect an electronic instrument against damages caused by external static electricity and transient voltage.

The receptacle may further comprise a first differential signal terminal protection element which is provided between the first differential signal terminal and the ground terminal, wherein the first differential signal terminal protection element may include at least one of the overvoltage protection element and the surge protection element.

This enables an electronic instrument to be protected against damages caused by transient voltage and static electricity entering the first differential signal terminal or the ground terminal of the receptacle from the outside.

The receptacle may further comprise a second differential signal terminal protection element which is provided between the second differential signal terminal and the ground terminal, wherein the second differential signal terminal protection element may include at least one of the overvoltage protection element and the surge protection element.

This enables an electronic instrument to be protected against damages caused by transient voltage and static electricity entering the second differential signal terminal or the ground terminal of the receptacle from the outside.

The receptacle may further comprise a short circuit protection element for protecting the power supply terminal against a short circuit.

This prevents occurrence of a short circuit between the power supply terminal and another terminal caused when a plug is incorrectly inserted into the receptacle.

In this receptacle, the short circuit protection element may be a fuse element or a switch element, the switch element being turned OFF when a temperature of the switch element is increased due to overcurrent and being turned ON when the temperature of the switch element is decreased due to removal of the overcurrent.

The embodiments of the present invention will be described below with reference to the drawings. Note that the embodiments described below do not in any way limit the scope of the invention laid out in the claims herein. Although the description of the embodiments illustrates a Universal Serial Bus (USB) receptacle, the present invention may also be applied to IEEE1394 or the like which is an interface standard for performing data transfer using differential signals. In addition, not all of the elements of the embodiments described below should be taken as essential requirements of the present invention.

1. First Embodiment

FIG. 1 is a schematic perspective view of a USB receptacle 100 according to a first embodiment. The receptacle 100 is an A receptacle defined in the USB standard. A terminal recess (may be called a "terminal cutaway recess") 110 is formed at the bottom of the receptacle 100. Terminals (power supply terminal VBUS, ground terminal GND, first differential signal terminal DP, and second differential signal terminal DM) stick out through the bottom (interior wall) of the receptacle 100. It suffices that the terminal recess 110 include at least two side walls which surround the bottom (interior wall) through which the terminals (VBUS, GND, DP, and DM) stick out. The receptacle 100 shown in FIG. 1 is a receptacle including the terminal recess 110 formed by three side walls formed perpendicularly to the bottom through which the terminals (VBUS, GND, DP, and DM) stick out, for example. The terminal recess 110 may be formed by four side walls formed perpendicularly to the bottom through which the terminals (VBUS, GND, DP, and DM) stick out. In this case, a fourth wall not shown in FIG. 1 may be provided, and through-holes (or through-grooves) which allow the terminals (VBUS, GND, DP, and DM) to pass therethrough may be provided in the fourth wall. The terminal recess 110 is a space for providing the terminals (VBUS, GND, DP, and DM).

A protection element is provided to a flexible substrate 10. N (four, for example) connection sections 13 connected with the terminals (VBUS, GND, DP, and DM) are further provided to the flexible substrate 10 (see FIG. 3). The connection section 13 is electrically connected with the terminal using a connection member (filler metal such as solder, for example). In the remaining drawings, components denoted by the same reference numbers have the same meanings.

Figure 2:
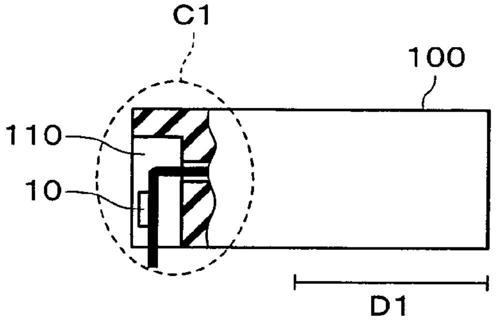
FIG. 2 is a partially cutaway schematic side view of the receptacle according to the first embodiment.

FIG. 2 is a partially cutaway schematic side view of the receptacle 100 shown in FIG. 1 viewed in a direction DRI. A section enclosed by a broken line C1 is a section in which the terminals (VBUS, GND, DP, and DM) shown in FIG. 1 are provided (second section other than a first section in a broad sense). A section indicated by a reference number D1 is a section into which a plug is inserted (first section in a broad sense). The dimensions of the section D1 are defined in the USB standard. The section indicated by the broken line C1 is a section of which the dimensions are not defined in the USB standard. Specifically, in a receptacle in which a sufficient space for providing the flexible substrate 10 does not exist in the section D1, it is difficult to provide the flexible substrate 10 in the section D1. However, since the dimensions of the section indicated by the broken line C1 (second section in a broad sense) are not defined in the USB standard, the flexible substrate 10 can be provided. In the case where a sufficient space exists in the section D1, the flexible substrate 10 may be provided in the section D1. The flexible substrate 10 shown in FIG. 1 may be formed to be placed inside the terminal recess 110. This enables the receptacle 100 to be disposed on a circuit board or the like without taking the size of the flexible substrate 10 into consideration. The size of the flexible substrate 10 is not limited thereto. The flexible substrate 10 may not be sized to be placed inside the terminal recess 110.

Figure 3:
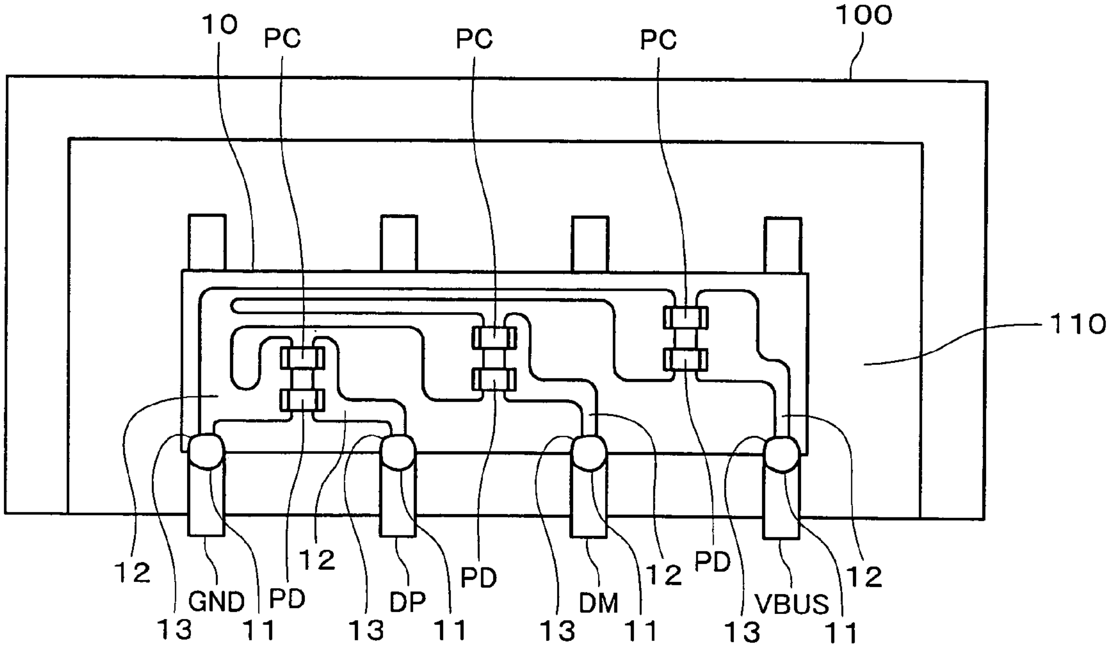
FIG. 3 is a bottom view of the receptacle according to the first embodiment.

FIG. 3 is a diagram showing the bottom of the section enclosed by the broken line C1 shown in FIG. 2. A chip capacitor PC (capacitor element in a broad sense; overvoltage protection element in a broader sense) and a Zener diode PD (surge protection element in a broad sense) are provided to the flexible substrate 10 as the protection element. As the chip capacitor, a multilayer chip capacitor or the like can be given. The Zener diode PD may be replaced with a surge absorber element such as a varistor. The connection sections 13 of interconnects 12 provided on the flexible substrate 10 are connected with the terminals (VBUS, GND, DP, and DM) using connection members 11 (filler metal such as solder, for example).

The protection element formed by connecting the chip capacitor PC and the Zener diode PD in parallel is provided between the power supply terminal VBUS and the ground terminal GND. The protection elements formed by connecting the chip capacitor PC and the Zener diode PD in parallel (first differential signal terminal protection element and second differential signal terminal protection element in a broad sense) are also provided between the first differential signal terminal DP and the ground terminal GND and between the second differential signal terminal DM and the ground terminal GND.

In an electronic instrument provided with a receptacle or the like, an internal circuit of the electronic instrument cannot be protected by a conventional receptacle when static electricity occurs outside the electronic instrument. In a small electronic instrument, since the interconnect distance between a receptacle and an internal logic circuit such as an IC is inevitably short, damage caused by external static electricity occurs to a greater extent. However, in the receptacle according to this embodiment, the Zener diodes PD are provided between the power supply terminal VBUS and the ground terminal GND, between the first differential signal terminal DP and the ground terminal GND, and between the second differential signal terminal DM and the ground terminal GND. This enables the internal IC or the like to be protected against external static electricity.

Figure 4:
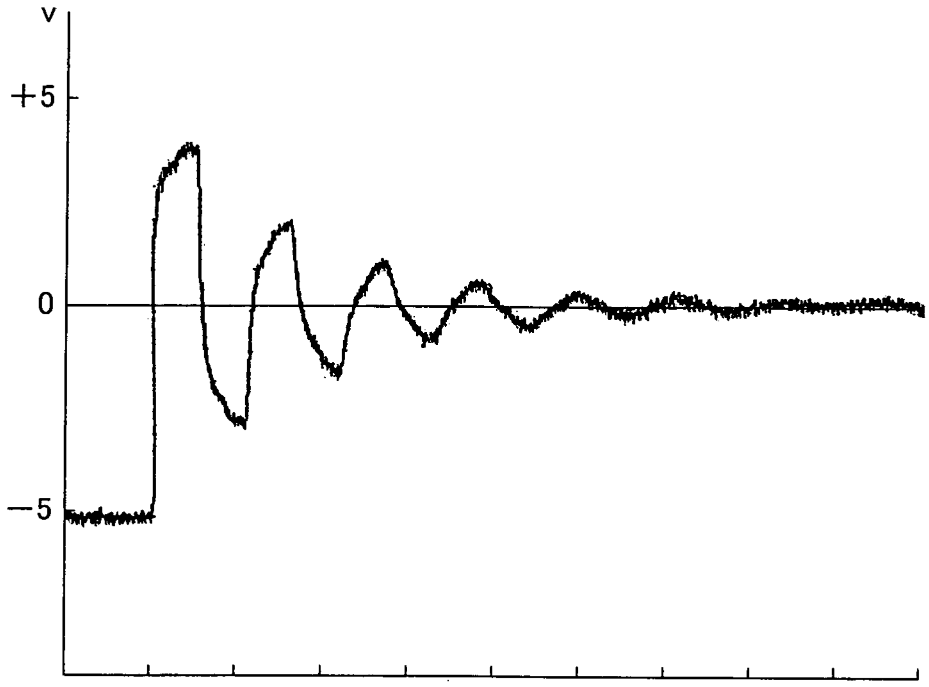
FIG. 4 is a waveform chart showing electromotive force which occurs during plugging and unplugging.

A counter electromotive force may occur during plugging and unplugging due to reactance of a cable connected with the receptacle or reactance of the receptacle. FIG. 4 is a graph showing a measurement result of counter electromotive force due to reactance. The waveform shown in FIG. 4 is a voltage waveform during plugging into and unplugging from the receptacle using a cable having a resistance of 40 Ω, a reactance of 2500 nH (500 cm in length×5 nH/cm), and a capacitance of 100 pF. As shown in FIG. 4, a maximum counter electromotive force of about ±5 V occurs. Specifically, since the interconnect distance between the receptacle and an internal IC or the like is short in a small electronic instrument, the counter electromotive force likely damages the internal IC or the like. A protection function against the counter electromotive force is not provided in a conventional receptacle. However, since the Zener diode PD is provided in the receptacle according to this embodiment, the internal IC or the like can be protected against the counter electromotive force caused by plugging and unplugging or the like. A reactance component is also included in the receptacle. Therefore, when the protection element is provided in the section into which a plug is inserted or in a cable, electromotive force may occur due to the reactance component of the receptacle during plugging and unplugging or the like, whereby the internal IC or the like may be damaged. However, in this embodiment, since the chip capacitor PC and the Zener diode PD (protection element in a broad sense) are provided in the section (second section) opposite to the section connected with a plug, the reactance component between the protection element and the internal IC or the like is extremely small. Specifically, the internal IC or the like can be protected against the counter electromotive force which occurs during plugging and unplugging or the like.

The USB standard defines that the voltage supplied to the power supply terminal VBUS should be 4.75 to 5.25 V. However, USB peripheral devices on the market do not necessarily satisfy this requirement. Some USB peripheral devices temporarily supply a voltage of about 10 V to the power supply terminal VBUS. A conventional receptacle does not have a function of protecting the internal IC or the like against a device which does not satisfy the above requirement. However, in the receptacle according to this embodiment, the chip capacitors PC are provided between the power supply terminal VBUS and the ground terminal GND, between the first differential signal terminal DP and the ground terminal GND, and between the second differential signal terminal DM and the ground terminal GND. Therefore, the receptacle according to this embodiment can protect the internal IC or the like against a device which does not satisfy the above requirement.

Figure 5:
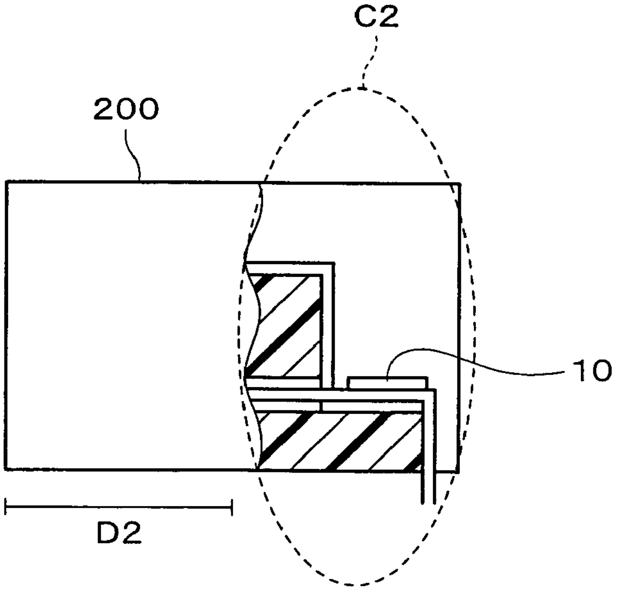
FIG. 5 is a partially cutaway schematic side view of another receptacle according to the first embodiment.

This embodiment may also be applied to a B receptacle defined in the USB standard. FIG. 5 is a partially cutaway schematic side view of the receptacle 200. In the receptacle 200, the flexible substrate 10 shown in FIG. 1 is provided to a B receptacle defined in the USB standard. A section enclosed by a broken line C2 is a section in which the terminals (power supply terminal VBUS, ground terminal GND, first differential signal terminal DP, and second differential signal terminal DM) are provided (second section other than a first section in a broad sense). A section indicated by a reference number D2 is a section into which a plug is inserted (first section in a broad sense). The dimensions of the section D2 are defined in the USB standard. The section indicated by the broken line C2 is a section of which the dimensions are not defined in the USB standard. The flexible substrate 10 shown in FIG. 1 may also be connected with the receptacle 200.

Figure 6:
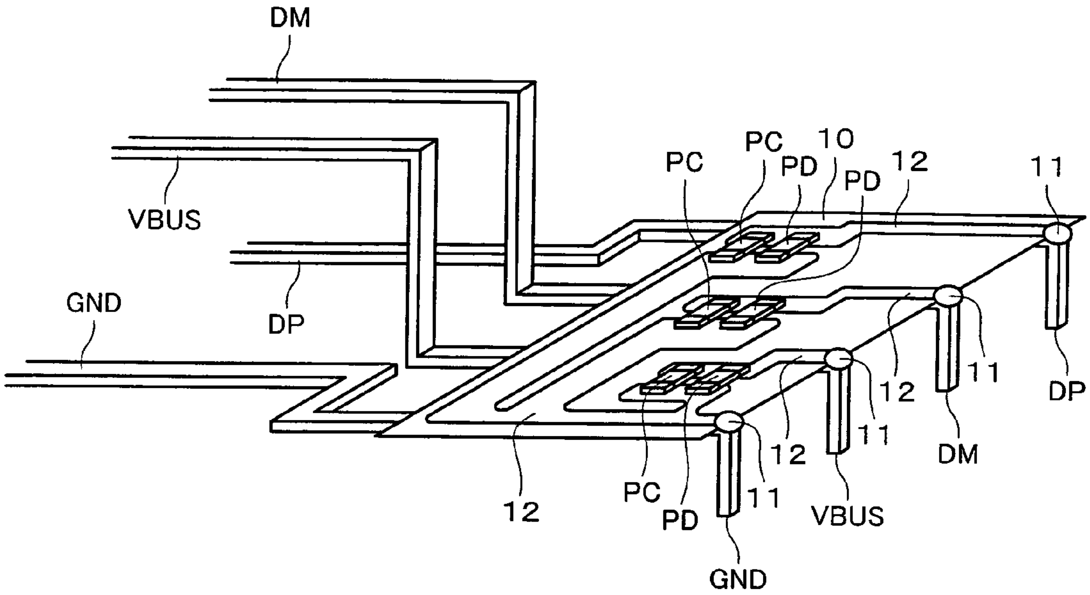
FIG. 6 shows a connection example of a flexible substrate according to the first embodiment.

FIG. 6 is a diagram showing the terminals (VBUS, GND, DP, and DM) in the section indicated by the broken line C2 shown in FIG. 5. FIG. 6 is a diagram showing a connection example in which the flexible substrate 10 is applied to the receptacle 200. As shown in FIG. 6, a part of each of the terminals (VBUS, GND, DP, and DM) is bent. The flexible substrate 10 is provided in the area in which all the terminals are arranged in one plane. The interconnects 12 of the flexible substrate 10 are connected with the terminals (VBUS, GND, DP, and DM) through the connection members 11. In the receptacle 200, protection elements (protection elements formed by connecting the chip capacitor PC and the Zener diode PD in parallel in FIG. 6) are provided between the power supply terminal VBUS and the ground terminal GND, between the first differential signal terminal DP and the ground terminal GND, and between the second differential signal terminal DM and the ground terminal GND in the same manner as in the receptacle 100.

However, since the flexible substrate 10 is flexible, the flexible substrate 10 may be bent and connected with the terminals without bending the terminals. The receptacle 200 exhibits the same effect as that of the receptacle 100.

2. Second Embodiment

Figure 7:
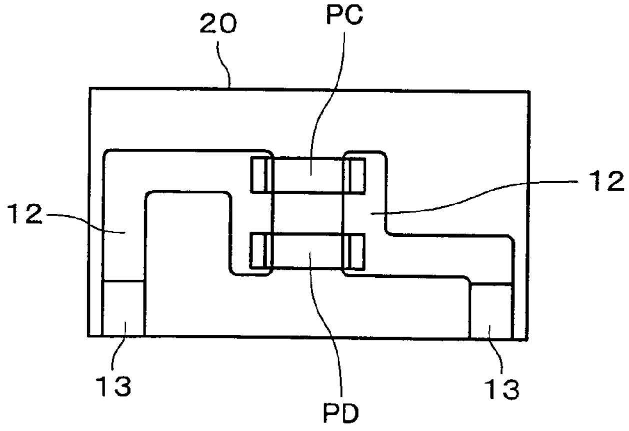
FIG. 7 shows a flexible substrate according to a second embodiment.

FIG. 7 is a diagram showing a flexible substrate 20 including an inter-terminal protection element. The chip capacitor PC and the Zener diode PD are provided in parallel on the flexible substrate 20. In a second embodiment, the flexible substrate 20 is provided to a receptacle.

Figure 8:
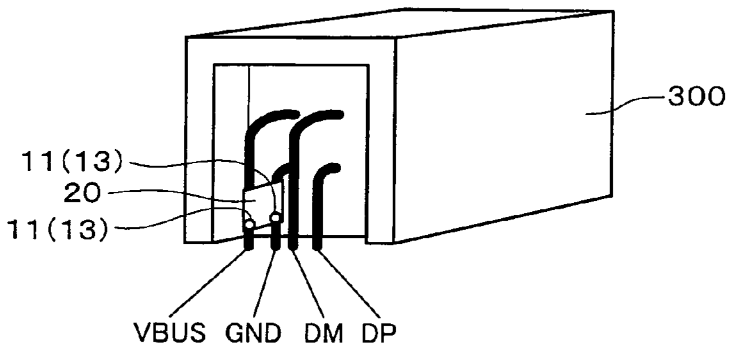
FIG. 8 is a schematic perspective view showing a receptacle according to the second embodiment.

FIG. 8 is a schematic perspective view showing a receptacle 300 according to the second embodiment. The receptacle 300 is a receptacle in which the flexible substrate 20 is provided to a B receptacle defined in the USB standard. The connection section 13 of the flexible substrate 20 is connected with the power supply terminal VBUS of the receptacle 300 through the connection member 11. Another connection section 13 of the flexible substrate 20 is connected with the ground terminal GND of the receptacle 300 through the connection member 11. This enables the protection element to be provided between the power supply terminal VBUS and the ground terminal GND, whereby the internal IC or the like can be protected against transient voltage and static electricity applied to the power supply terminal VBUS.

Figure 9:
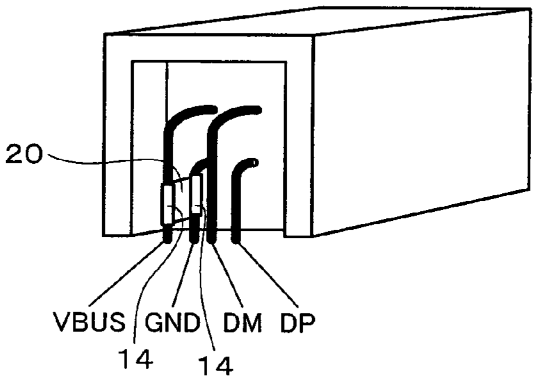
FIG. 9 is a schematic perspective view showing another receptacle according to the second embodiment.

FIG. 9 is a modification of the receptacle 300 shown in FIG. 8. The connection section 13 of the flexible substrate 20 is wound around and pressure-bonded to the power supply terminal VBUS and the ground terminal GND as indicated by a reference number 14. The flexible substrate 20 may be connected as shown in FIG. 9. This also applies to embodiments described below.

Figure 10:
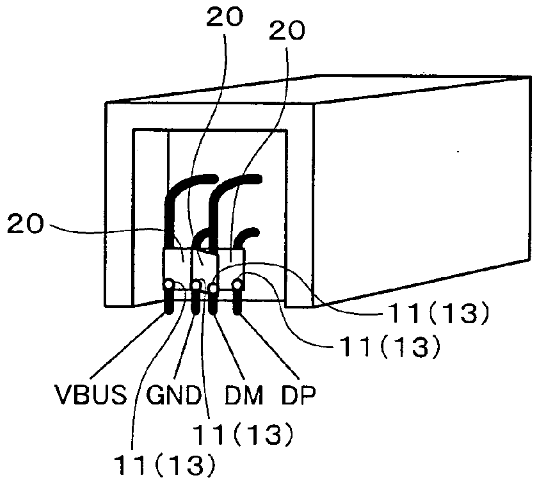
FIG. 10 is a schematic perspective view showing still another receptacle according to the second embodiment.

In the case where it is necessary to provide the protection elements (first differential signal terminal protection element and second differential signal terminal protection element in a broad sense) between the first differential signal terminal DP and the ground terminal GND and between the second differential signal terminal DM and the ground terminal GND, the flexible substrate 20 may be provided as shown in FIG. 10. This enables the internal IC or the like to be protected against transient voltage and static electricity.

Figure 11:
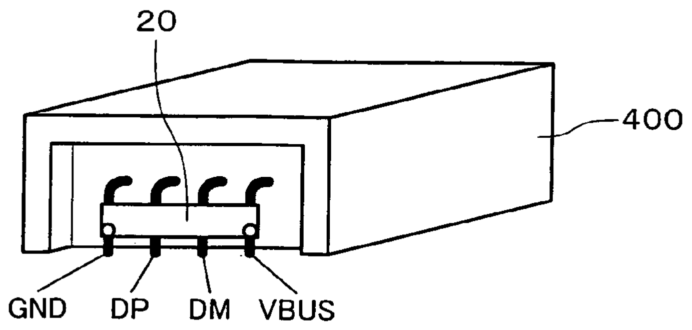
FIG. 11 is a schematic perspective view showing a further receptacle according to the second embodiment.

The flexible substrate 20 may also be applied to an A receptacle defined in the USB standard. A receptacle 400 shown in FIG. 11 is a receptacle in which the flexible substrate 20 shown in FIG. 7 is provided to an A receptacle defined in the USB standard. In the case of providing the protection element between the power supply terminal VBUS and the ground terminal GND, the connection section 13 of the flexible substrate 20 may be connected with the ground terminal GND of the receptacle 400, and another connection section 13 of the flexible substrate 20 may be connected with the power supply terminal VBUS of the receptacle 400, as shown in FIG. 11. This enables the internal IC or the like to be protected against transient voltage and static electricity applied to the power supply terminal VBUS.

Since the protection element can be provided in a desired area by using the flexible substrate 20 shown in FIG. 7, it is possible to deal with various applications.

Figure 12:
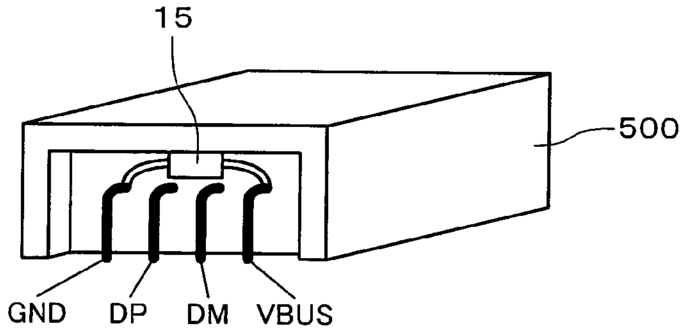
FIG. 12 is a schematic perspective view showing a receptacle according to a modification of the second embodiment.
Figure 13:
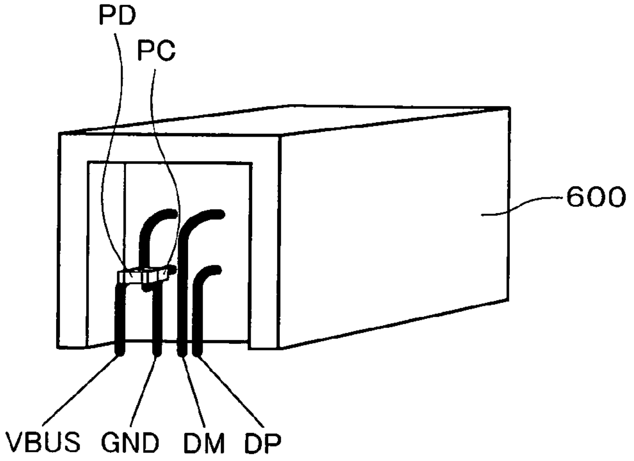
FIG. 13 is a schematic perspective view showing a receptacle according to another modification of the second embodiment.

As a modification of the second embodiment, a protection element 15 may be directly provided between the power supply terminal VBUS and the ground terminal GND without using the flexible substrate 20 (see FIG. 12). A receptacle 500 shown in FIG. 12 is a receptacle in which the protection element 15 is provided to an A receptacle defined in the USB standard. The protection element 15 is formed by connecting the chip capacitor PC and the Zener diode PD in parallel. A receptacle 600 shown in FIG. 13 is a receptacle in which the chip capacitor PC and the Zener diode PD are provided between the power supply terminal VBUS and the ground terminal GND of a B receptacle defined in the USB standard. The power supply terminal VBUS is bent. The chip capacitor PC and the Zener diode PD are directly provided between the power supply terminal VBUS and the ground terminal GND. The receptacle 500 shown in FIG. 12 and the receptacle 600 shown in FIG. 13 can protect the internal IC or the like against transient voltage and static electricity applied to the power supply terminal VBUS.

3. Third Embodiment

Figure 14:
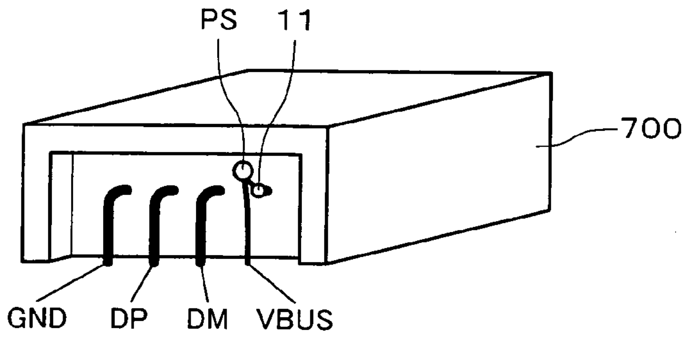
FIG. 14 is a schematic perspective view showing a receptacle according to a third embodiment.

FIG. 14 is a schematic perspective view showing a receptacle 700 according to a third embodiment. The receptacle 700 is a receptacle in which a polyswitch PS (short circuit protection element in a broad sense) is provided to the power supply terminal VBUS of an A receptacle defined in the USB standard.

One terminal of the polyswitch PS is connected with the power supply terminal VBUS using the connection member 11. The other terminal of the polyswitch PS is used as the power supply terminal VBUS of the receptacle 700. The internal IC or the like can be protected when the power supply terminal VBUS and the ground terminal GND are short-circuited by providing the polyswitch PS to the power supply terminal VBUS.

In the case where a plug is incorrectly inserted into an A receptacle defined in the USB standard in the direction opposite to the normal connection direction (hereinafter may be called "reverse insertion"), the power supply terminal VBUS and the ground terminal GND come in contact with the shield of the A receptacle, whereby the power supply terminal VBUS and the ground terminal GND are short-circuited. This may cause a large amount of current to flow between the power supply terminal VBUS and the ground terminal GND, whereby the internal IC or the like may be damaged. However, the polyswitch PS is provided to the power supply terminal VBUS in this embodiment. The polyswitch PS is turned ON/OFF depending on the temperature characteristics. The temperature of the polyswitch PS rises when the amount of current flowing through the polyswitch PS increases, and the polyswitch PS is turned OFF when the temperature has reached or exceeded a predetermined temperature. Specifically, the polyswitch PS does not conduct electricity between the terminals, whereby the short-circuiting state between the power supply terminal VBUS and the ground terminal GND is cancelled. The polyswitch PS is turned ON when the temperature of the polyswitch PS becomes lower than the predetermined temperature. Specifically, the polyswitch PS conducts electricity between the terminals.

The receptacle according to this embodiment can protect the internal IC or the like against a short circuit between the power supply terminal VBUS and the ground terminal GND caused by reverse insertion or the like.

Figure 15:
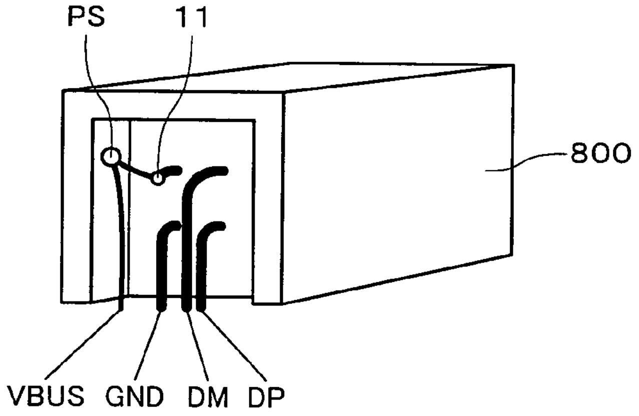
FIG. 15 is a schematic perspective view showing another receptacle according to the third embodiment.

FIG. 15 is a schematic perspective view showing a receptacle 800 according to the third embodiment. The receptacle 800 is a receptacle in which the polyswitch PS is provided to the power supply terminal VBUS of a B receptacle defined in the USB standard in the same manner as in the receptacle 700 shown in FIG. 14. The receptacle 800 exhibits the same effect as that of the receptacle 700 shown in FIG. 14.

4. Fourth Embodiment

Figure 16:
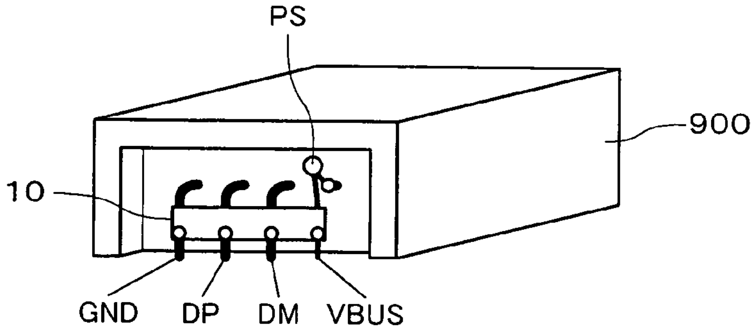
FIG. 16 is a schematic perspective view showing a receptacle according to a fourth embodiment.

FIG. 16 is a schematic perspective view showing a receptacle 900 according to a fourth embodiment.

The receptacle 900 is a receptacle in which the polyswitch PS described in the third embodiment is provided to the power supply terminal VBUS of the receptacle 100 in the first embodiment (see FIG. 1). This enables the receptacle 900 to protect the internal IC or the like against a short circuit between the power supply terminal VBUS and the ground terminal GND (caused by reverse insertion or the like) in addition to damage caused by transient voltage and static electricity.

Figure 17:
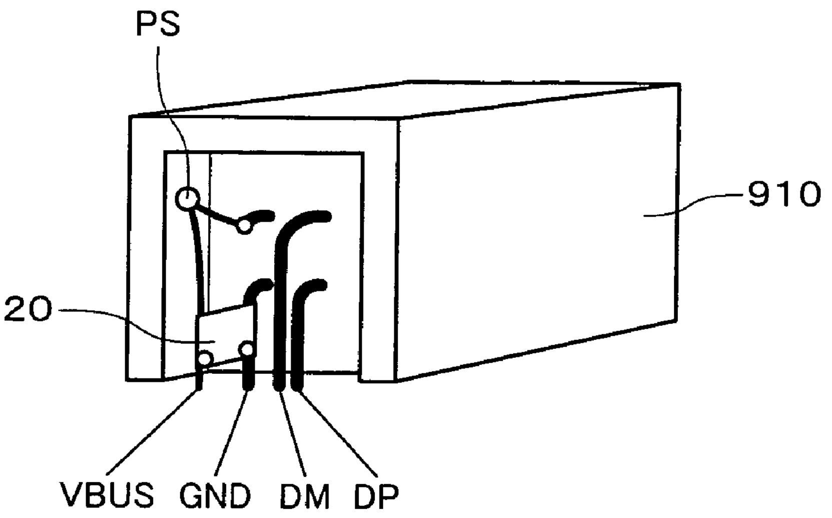
FIG. 17 is a schematic perspective view showing another receptacle according to the fourth embodiment.

FIG. 17 is a schematic perspective view showing a receptacle 910 according to the fourth embodiment.

The receptacle 910 is a receptacle in which the polyswitch PS described in the third embodiment is provided to the power supply terminal VBUS of the receptacle 300 in the second embodiment (see FIG. 8). This enables the receptacle 910 to protect the internal IC or the like against a short circuit between the power supply terminal VBUS and the ground terminal GND (caused by reverse insertion or the like) in addition to damage caused by transient voltage and static electricity applied to the power supply terminal VBUS.

Figure 18:
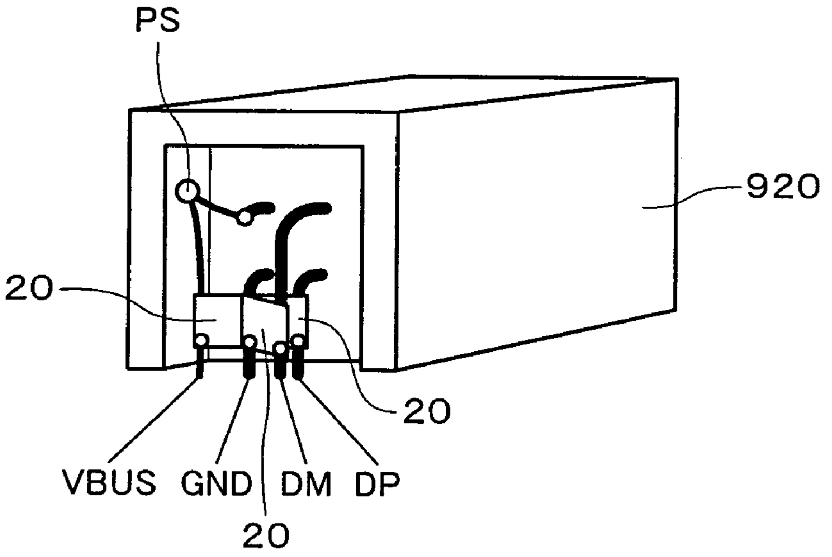
FIG. 18 is a schematic perspective view showing still another receptacle according to the fourth embodiment.

FIG. 18 is a schematic perspective view showing a receptacle 920 according to the fourth embodiment.

The receptacle 920 is a receptacle in which the polyswitch PS described in the third embodiment is provided to the power supply terminal VBUS of the receptacle in the second embodiment (see FIG. 10). The receptacle 920 exhibits the same effect as that of the receptacle 900.

Although not shown in the drawings, the polyswitch PS may be provided to the power supply terminal VBUS of the receptacle in which the flexible substrate 10 is provided (see FIG. 6), the receptacle 400 in which the flexible substrate 20 is provided (see FIG. 11), the receptacle 500 in which the protection element 15 is provided (see FIG. 12), or the like.

A fuse element may be provided to the power supply terminal VBUS of the receptacle 700, 800, 900, 910, and 920 instead of the polyswitch PS.

The flexible substrates 10 and 20 according to the first to fourth embodiments may also be applied to a mini-A receptacle, a mini-B receptacle, and a mini-AB receptacle defined in the USB standard. Since such a small receptacle is generally installed in a small electronic instrument (such as a portable telephone, digital still camera, digital video camera, PDA, or portable music player), an internal IC or the like of the small electronic instrument can be protected against damage caused by transient voltage, static electricity, and short circuit by applying the present invention. A small electronic instrument is very sensitive to damage caused by transient voltage and static electricity from the outside and damage caused by a short circuit, since the interconnect distance between the receptacle and the internal IC or the like is short on design. Therefore, the present invention exhibits a remarkable effect on a small electronic instrument.

In the receptacles 100 and 200, the chip capacitor PC and the Zener diode PD are provided for protection against surges and overvoltage. However, if surge protection is unnecessary, the Zener diode PD may not be provided. If overvoltage protection is unnecessary, the chip capacitor PC may not be provided.

The connection section 13 of the flexible substrate 10 or 20 may be connected with the terminal using a metal junction or the like instead of the filler metal.

Although only some embodiments of the present invention have been described in detail above, those skilled in the art will readily appreciate that many modifications are possible in the embodiments without departing from the novel teachings and advantages of this invention. Accordingly, all such modifications are intended to be included within the scope of this invention. For example, any term cited with a different term having broader or the same meaning at least once in this specification or drawings can be replaced by the different term in any place in this specification and drawings.

What is claimed is:

1. A receptacle which is defined in a given interface standard, performs data transfer by using differential signals, and is connected to a plug when transmitting a signal between devices, the receptacle comprising:

a power supply terminal;

a ground terminal;

a first differential signal terminal used for transmitting one of the differential signals;

a second differential signal terminal used for transmitting another of the differential signals, the second differential signal terminal making a pair with the first differential signal terminal; and at least one protection element provided between the power supply terminal and the ground terminal, wherein:

dimensions of the receptacle are defined in a given interface standard;

the receptacle further includes a first section which is connected to the plug and a second section which is provided within a part other than the first section;

the protection element is provided in the second section;

the second section has a terminal recess;

the power supply terminal, the ground terminal, the first terminal, and the second terminal stick out through a bottom of the terminal recess; and the protection element is provided in the terminal recess.

2. The receptacle as defined in claim 1, wherein the protection element is at least one of an overvoltage protection element for overvoltage protection and a surge protection element for electrostatic protection.

3. The receptacle as defined in claim 2, comprising:

both the overvoltage protection element and the surge protection element as the protection element, wherein the surge protection element is connected to the overvoltage protection element in parallel.

4. The receptacle as defined in claim 3, further comprising:

a first differential signal terminal protection element which is provided between the first differential signal terminal and the ground terminal, wherein the first differential signal terminal protection element includes at least one of the overvoltage protection element and the surge protection element.

5. The receptacle as defined in claim 2, further comprising:

a first differential signal terminal protection element which is provided between the first differential signal terminal and the ground terminal, wherein the first differential signal terminal protection element includes at least one of the overvoltage protection element and the surge protection element.

6. The receptacle as defined in claim 5, further comprising:

a second differential signal terminal protection element which is provided between the second differential signal terminal and the ground terminal, wherein the second differential signal terminal protection element includes at least one of the overvoltage protection element and the surge protection element.

7. The receptacle as defined in claim 5, further comprising a short circuit protection element for protecting the power supply terminal against a short circuit.

8. The receptacle as defined in claim 2, further comprising a short circuit protection element for protecting the power supply terminal against a short circuit.

9. The receptacle as defined in claim 1, further comprising a short circuit protection element for protecting the power supply terminal against a short circuit.

10. The receptacle as defined in claim 9, wherein the short circuit protection element is a fuse element or a switch element, the switch element being turned OFF when a temperature of the switch element is increased due to overcurrent and being turned ON when the temperature of the switch element is decreased due to removal of the overcurrent.

* * * * *